(12) United States Patent
Dettinger et al.

(10) Patent No.: US 9,043,365 B2
(45) Date of Patent: May 26, 2015

(54) PEER TO PEER (P2P) FEDERATED CONCEPT QUERIES

(75) Inventors: Richard D. Dettinger, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1873 days.

(21) Appl. No.: 12/145,584

(22) Filed: Jun. 25, 2008

(65) Prior Publication Data

US 2008/0250006 A1    Oct. 9, 2008

Related U.S. Application Data

(63) Continuation-in-part of application No. 11/226,181, filed on Sep. 14, 2005, which is a continuation of application No. 10/083,075, filed on Feb. 26, 2002, now Pat. No. 6,996,558.

(51) Int. Cl.
*G06F 17/30* (2006.01)

(52) U.S. Cl.
CPC .... *G06F 17/30566* (2013.01); *G06F 17/30964* (2013.01)

(58) Field of Classification Search
USPC .......... 707/759–763, 999.001, 999.004, 707/999.003, 802
See application file for complete search history.

(56) References Cited

U.S. PATENT DOCUMENTS

| | | | |
|---|---|---|---|
| 5,253,362 A | 10/1993 | Nolan et al. | |
| 5,734,887 A | 3/1998 | Kingberg et al. | |
| 6,009,422 A * | 12/1999 | Ciccarelli | 1/1 |
| 6,233,586 B1 * | 5/2001 | Chang et al. | 1/1 |
| 6,457,009 B1 * | 9/2002 | Bollay | 707/770 |
| 6,460,043 B1 * | 10/2002 | Tabbara et al. | 1/1 |
| 6,553,368 B2 | 4/2003 | Martin et al. | |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,024,425 B2 | 4/2006 | Krishnaprasad et al. | |
| 7,096,229 B2 | 8/2006 | Dettinger et al. | |
| 2002/0078068 A1 | 6/2002 | Krishnaprasad et al. | |
| 2002/0083039 A1 * | 6/2002 | Ferrari et al. | 707/1 |

(Continued)

OTHER PUBLICATIONS

Theriault, Marlene, et al., "Oracle DBA 101," 2001, Osborne/McGraw-Hill, p. 30-32, 37, 388-389, 397, 398.*

(Continued)

*Primary Examiner* — Amresh Singh
(74) *Attorney, Agent, or Firm* — Patterson & Sheridan, LLP

(57) ABSTRACT

Embodiments of the invention are generally related to data processing, and more specifically to retrieving results for a query from one or more devices coupled to a network. A first device may receive an abstract query including logical fields defined by a first data abstraction model and retrieve query results stored in the first device. The query may be sent to one or more other devices via the network. The one or more other devices may be configured to convert the abstract query to local abstract queries including logical fields defined in local data abstraction models. The local queries may be issued against local databases to retrieve additional results for the query.

20 Claims, 10 Drawing Sheets

(56) References Cited

U.S. PATENT DOCUMENTS

2003/0220893 A1 11/2003 Dettinger et al.
2006/0010127 A1 1/2006 Dettinger et al.

OTHER PUBLICATIONS

U.S. Patent Application entitled "Peer to Peer (P2P) Concept Query Abstraction Model Augmentation With Federated Access Only Elements" by Richard D. Dettinger et al., filed Jun. 25, 2008.
U.S. Patent Application entitled "Peer to Peer (P2P) Concept Query Notification of Available Query Augmentation Within Query Results" by Richard D. Dettinger et al., filed Jun. 25, 2008.
U.S. Patent Application entitled "Peer to Peer (P2P) Federated Concept Queries" by Richard D. Dettinger et al., filed Jun. 25, 2008.
Llama, "Search Code: Search Your Database," <http://www.codewalkers.com/c/a/Search-Code/Search-Your-Database/>, retrieved Mar. 23, 2009, pp. 1-4.
Meng et al., "A Theory of Translation From Relational Queries to Hierarchical Queries," *IEEE Transactions on Knowledge and Data Engineering*, Apr. 1995, vol. 7(2): pp. 228-245.
Office Action History for U.S. Appl. No. 10/083,075 from Nov. 26, 2004 to Sep. 1, 2005.
Office Action History for U.S. Appl. No. 11/226,181 from Mar. 25, 2009 to Aug. 10, 2010.
Office Action of U.S. Appl. No. 11/226,181 dated Feb. 11, 2011.

* cited by examiner

PEER TO PEER (P2P) FEDERATED CONCEPT QUERIES

CROSS-REFERENCE TO RELATED APPLICATIONS

This application is a continuation-in-part of co-pending U.S. patent application Ser. No. 11/226,181, filed Sep. 14, 2005, which is a continuation of U.S. patent application Ser. No. 10/083,075, filed Feb. 26, 2002 now U.S. Pat. No. 6,996,558. Each of the aforementioned related patent applications is herein incorporated by reference in its entirety.

BACKGROUND OF THE INVENTION

1. Field of the Invention

The present invention is generally related to data processing, and more specifically to retrieving data from a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find the location of data, and so forth.

Any requesting entity, including applications, operating systems and, at the highest level, users, can issue queries against data in a database. Queries may be predefined (i.e., hard coded as part of an application) or may be generated in response to input (e.g., user input). Upon execution of a query against a database, a query result is returned to the requesting entity.

SUMMARY OF THE INVENTION

The present invention is generally related to data processing, and more specifically to retrieving data from a database.

One embodiment of the invention provides a computer-implemented method for retrieving query results. The method generally comprises receiving, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being standardized metadata.

The method further comprises converting the abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts. The method also comprises issuing the second abstract query against the second database to retrieve results for the second abstract query, and providing the results of the second abstract query to the requesting entity.

Another embodiment of the invention provides a computer readable medium containing a program which, when executed, performs an operation, generally comprising receiving, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being standardized metadata.

The operation further comprises converting the abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts. The operation also comprises issuing the second abstract query against the second database to retrieve results for the second abstract query, and providing the results of the second abstract query to the requesting entity.

Yet another embodiment of the invention provides a system, generally comprising a plurality of devices coupled via a network. Each device is generally configured to receive, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being standardized metadata.

Each device is further configured to convert the abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts. Each device is also configured to issue the second abstract query against the second database to retrieve results for the second abstract query, and provide the results of the second abstract query to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
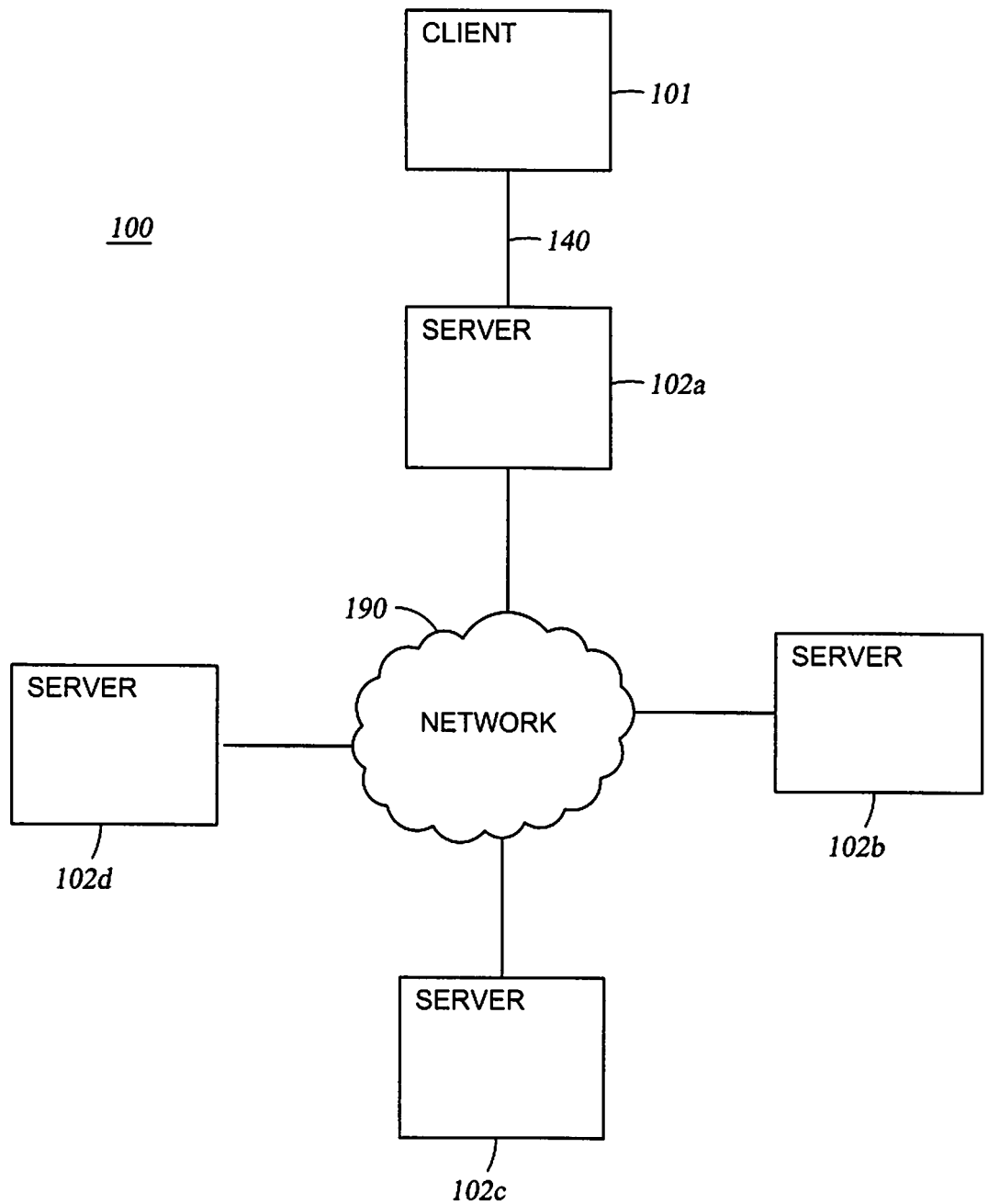
FIG. 1 illustrates an exemplary system according to an embodiment of the invention.

Embodiments of the invention are generally related to data processing, and more specifically to retrieving results for a query from one or more devices coupled to a network. A first device may receive an abstract query including logical fields defined by a first data abstraction model and retrieve query results stored in the first device. The query may be sent to one or more other devices via the network. The one or more other devices may be configured to convert the abstract query to local abstract queries including logical fields defined in local data abstraction models. The local queries may be issued against local databases to retrieve additional results for the query.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the invention may be implemented. In general, the networked system 100 includes at least one client (e.g., user's) computer 101 and a plurality of servers 102 (four such servers 102a-d shown). The client computer 101 may be coupled with a server 102 (server 102a in FIG. 1) via a network 140. In general, the network 140 may be a local area network (LAN) and/or a wide area network (WAN). In a particular embodiment, the network 140 is the Internet. In one embodiment, the client computer 101 may be configured to issue queries against the server 102a and retrieve data from the server 102a, as will be described in greater detail below.

Each of the servers 102 may be coupled with each other via a network 190. Like network 140, network 190 may also be any one of 140 may be any one or a local area network (LAN), a wide area network (WAN), and/or the Internet. In a particular embodiment of the invention the network 190 may be a peer-to-peer network. A peer-to-peer network is defined herein as any network comprising two or more interconnected devices that are configured to share their respective data, resources, and the like. The devices associated with network 190 may be coupled in any reasonable manner, whether known or unknown, to form any type of PP network. Exemplary P2P network types include centralized P2P network, decentralized P2P network, structured P2P network, unstructured P2P network, hybrid P2P network, and the like.

Regardless of the type of PP network 190, generally, any server 102 connected to the P2P network 190 may be configured to independently collect, store, analyze and modify data. Furthermore, the data stored on any server 102 may be transferred to any other server 102 via the network 190. For example, in one embodiment, each server 102 may be configured to issue queries to one or more other servers 102 via the network 190 to retrieve desired data.

While two separate networks 140 and 190 are illustrated in FIG. 1, in alternative embodiments, client computers 101 and the servers 102 may be coupled to the same network, for example, the Internet.

In one embodiment of the invention, in response to receiving a query from the client computer 101, server 102a may be configured to retrieve query results that are stored therein. The server 102a may also be configured to transfer the query to one or more other servers 102 via the network 190, retrieve further query results stored in the one or more other server 102, and provide the query results to the client computer 101. Retrieving query results from one or more servers 102 coupled with the P2P network 190 is described in greater detail below.

Figure 2:
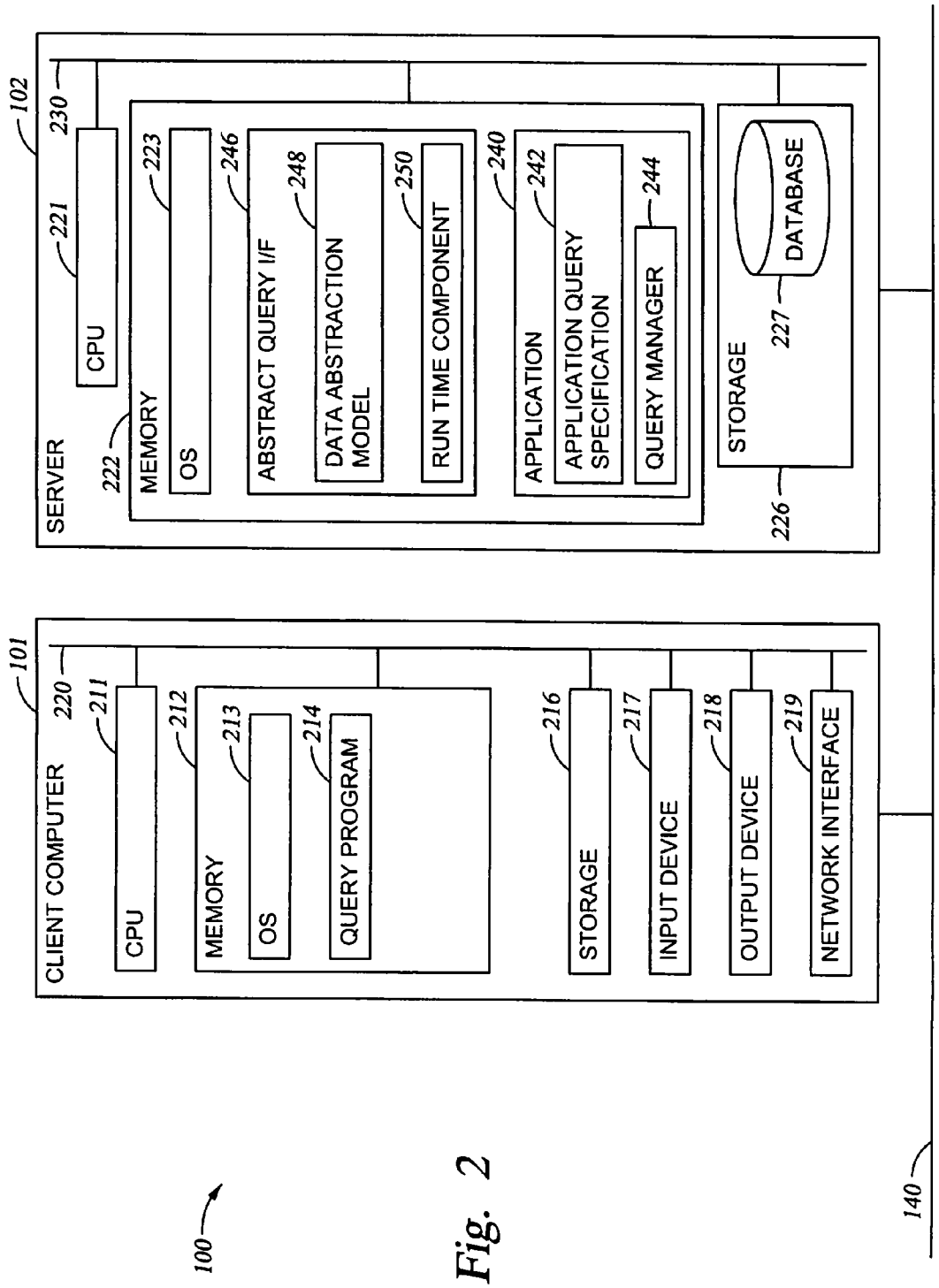
FIG. 2 illustrates a more detailed view of an exemplary client computer and server, according to an embodiment of the invention.

FIG. 2 illustrates a more detailed view of an exemplary client computer 101 and a server 102, according to an embodiment of the invention. The server 102 may be any one or servers 102a-d depicted in FIG. 1. The client computer 101 may include a Central Processing Unit (CPU) 211 connected via a bus 220 to a memory 212, storage 216, an input device 217, an output device 218, and a network interface device 219. The input device 217 can be any device to give input to the client computer 101. For example, a keyboard, keypad, light-pen, touch-screen, track-ball, or speech recognition unit, audio/video player, and the like could be used. The output device 218 can be any device to give output to the user, e.g., any conventional display screen. Although shown separately from the input device 217, the output device 218 and input device 217 could be combined. For example, a display screen with an integrated touch-screen, a display with an integrated keyboard, or a speech recognition unit combined with a text speech converter could be used.

The network interface device 219 may be any entry/exit device configured to allow network communications between the client computers 101 and server 102 via the network 140. For example, the network interface device 219 may be a network adapter or other network interface card (NIC).

Storage 216 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 212 and storage 216 could be part of one virtual address space spanning multiple primary and secondary storage devices.

The memory 212 is preferably a random access memory sufficiently large to hold the necessary programming and data structures of the invention. While memory 212 is shown as a single entity, it should be understood that memory 212 may in fact comprise a plurality of modules, and that memory 212 may exist at multiple levels, from high speed registers and caches to lower speed but larger DRAM chips.

Illustratively, the memory 212 contains an operating system 213. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 212 is also shown containing a query program 114 which, when executed by CPU 211, provides support for issuing queries to server 102. In one embodiment, the query program 214 may include a web-based Graphical User Interface (GUI), which allows the user to display Hyper Text Markup Language (HTML) information. The GUI may be configured to allow a user to create a query, issue the query against a server 102, and display the results of the query. More generally, however, the query program may be a GUI-based program capable of rendering any information transferred between the client computer 101 and the server 102.

The server 102 may be physically arranged in a manner similar to the client computer 101. Accordingly, the server 102 is shown generally comprising a CPU 221, memory 222, and a storage device 226, coupled with one another by a bus 130. Memory 222 may be a random access memory sufficiently large to hold the necessary programming and data structures that are located on server 102.

The server 102 may generally be under the control of an operating system 223 shown residing in memory 222. Examples of the operating system 123 include IBM OS/400®, UNIX, Microsoft Windows®, Linux and the like. More generally, any operating system capable of supporting the functions described herein may be used.

The memory 222 may further include one or more applications 240 and an abstract query interface 246. The applications 240 and the abstract query interface 246 may be software products comprising a plurality of instructions that are resident at various times in various memory and storage devices in the computer system 100. When read and executed by a processor 221 in the server 102, the applications 240 and the abstract query interface 246 cause the computer system 100 to perform the steps necessary to execute steps or elements embodying the various aspects of the invention.

The applications 240 (and more generally, any requesting entity, including the operating system 223) may be configured to issue queries against a database 227 (shown in storage 226). The database 227 is representative of any collection of data regardless of the particular physical representation. By way of illustration, the database 227 may be organized according to a relational schema (accessible by SQL queries) or according to an XML schema (accessible by XML queries). However, the invention is not limited to a particular schema and contemplates extension to schemes presently unknown. As used herein, the term "schema" generically refers to a particular arrangement of data.

In one embodiment, the queries issued by the applications 240 are defined according to an application query specification 242 included with each application 240. The queries issued by the applications 240 may be predefined (i.e., hard coded as part of the applications 240) or may be generated in response to input (e.g., user input). In either case, the queries (referred to herein as "abstract queries") are composed using logical fields defined by the abstract query interface 246. In particular, the logical fields used in the abstract queries are defined by a data abstraction model 248 of the abstract query interface 246. The abstract queries are executed by a runtime component 250 which transforms the abstract queries into a form consistent with the physical representation of the data contained in the database 227. The application query specification 242 and the abstract query interface 246 are further described with reference to FIG. 3.

The applications 240 may also include a query manager program 244. Query manager 244 may be configured to receive a query from a client computer 101, or an application 240, receive results for the query, and provide the query results to the requesting client computer 101 or application 240. In one embodiment of the invention retrieving query results may involve retrieving query results from the database 227, as described above. In some embodiments, the query manager 244 may be configured to transfer a received query to one or more other servers 102 via the P2P network 190, and retrieve query results from the one or more other servers 102, as will be discussed in greater detail below.

Relational View of Environment

Figure 3:
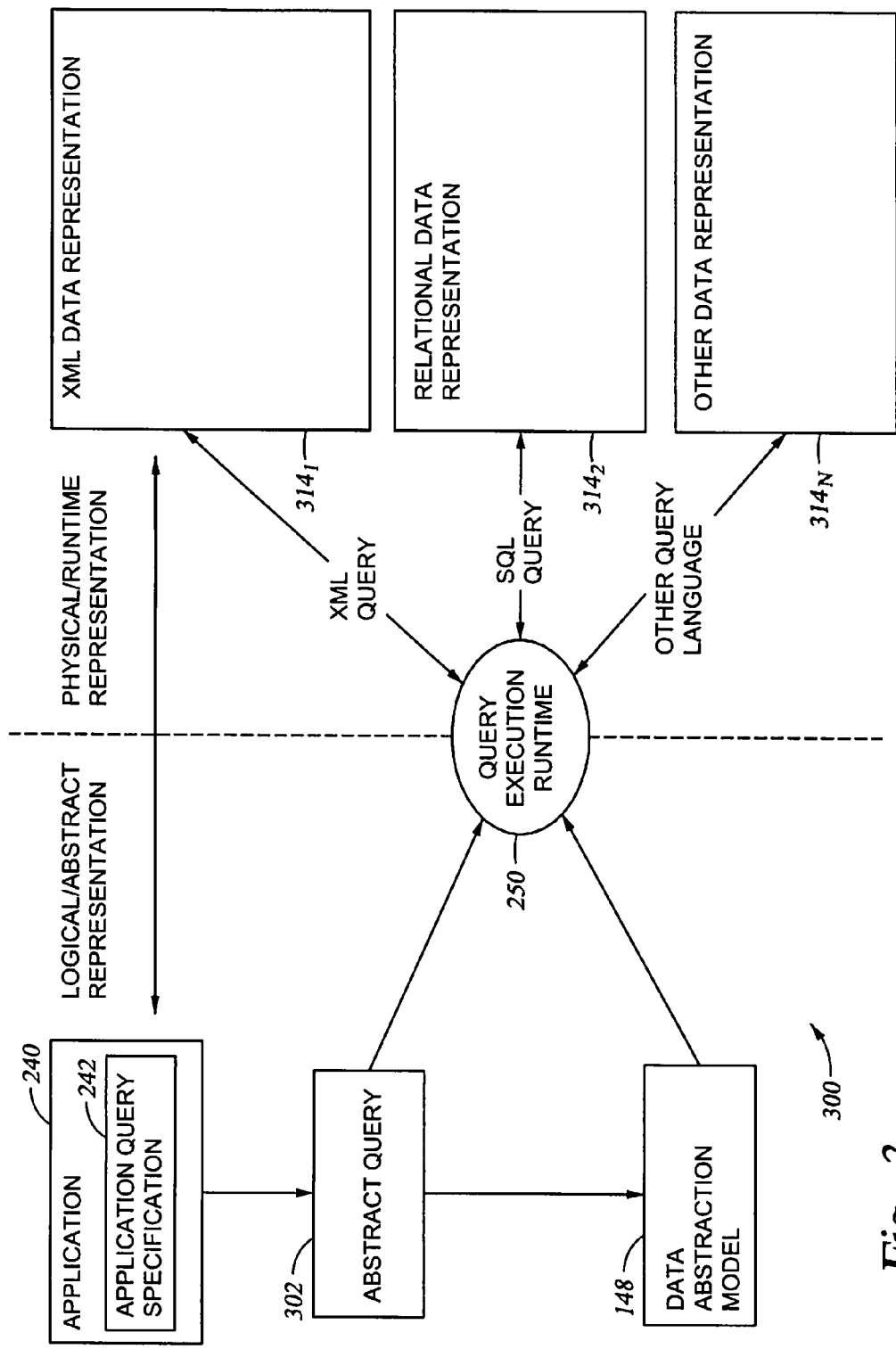
FIG. 3 illustrates an exemplary relational view 300 of system components according to an embodiment of the invention.

FIG. 3 illustrates an exemplary relational view 300 of components according to an embodiment of the invention. A requesting entity, for example, an application 240 may issue a query 302 as defined by the respective application query specification 242 of the requesting entity. The resulting query 302 is generally referred to herein as an "abstract query" because the query is composed according to abstract (i.e., logical) fields rather than by direct reference to the underlying physical data entities in the database 227. As a result, abstract queries may be defined that are independent of the particular underlying data representation used. In one embodiment, the application query specification 242 may include both criteria used for data selection and an explicit specification of the fields to be returned based on the selection criteria.

The logical fields specified by the application query specification 242 and used to compose the abstract query 302 may be defined by the data abstraction model 248. In general, the data abstraction model 248 may expose information as a set of logical fields that may be used within a query (e.g., the abstract query 302) issued by the application 240 to specify criteria for data selection and specify the form of result data returned from a query operation. The logical fields may be defined independently of the underlying data representation being used in the database 227, thereby allowing queries to be formed that are loosely coupled to the underlying data representation. Abstract queries are described in greater detail in co-pending U.S. patent application Ser. No. 11/226,181, entitled IMPROVED APPLICATION PORTABILITY AND EXTENSIBILITY THROUGH DATABASE SCHEMA AND QUERY ABSTRACTION, filed Sep. 14, 2005, which is incorporated herein by reference in its entirety.

Figure 4:
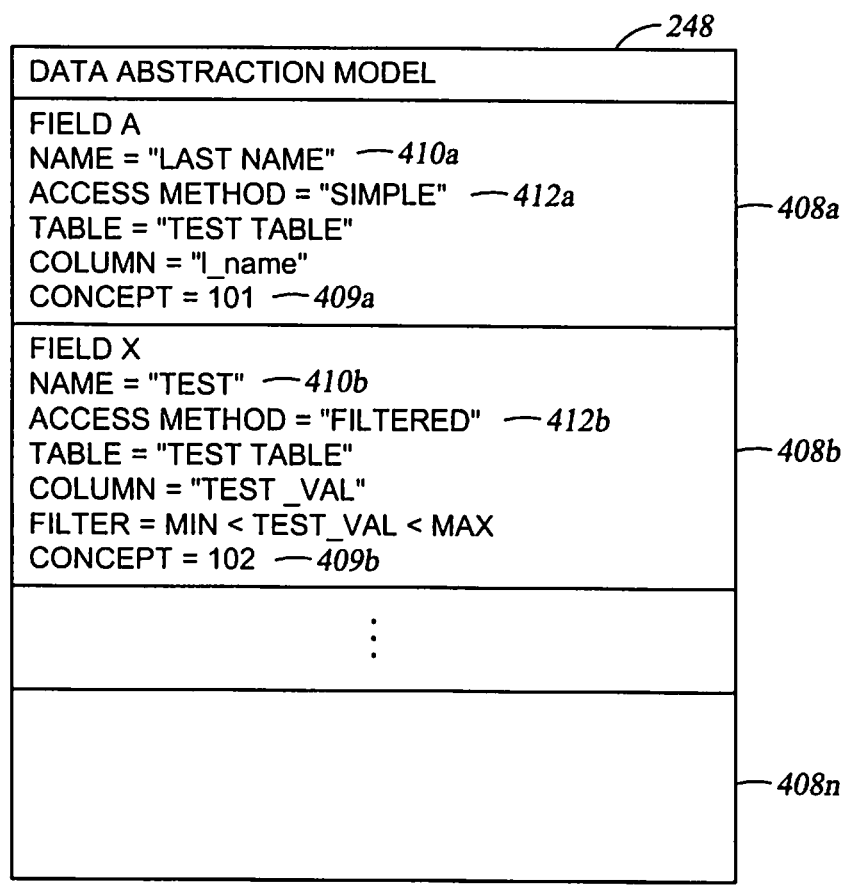
FIG. 4 illustrates a data abstraction model according to an embodiment of the invention.

FIG. 4 illustrates an exemplary data abstraction 148 model according to an embodiment of the invention. In general, data abstraction model 148 comprises a plurality of field specifications 408. A field specification may be provided for each logical field available for composition of an abstract query. Each field specification may comprise a logical field name 410 and access method 412. For example, the field specification for Field A in FIG. 3 includes a logical field name 410a ('LastName'), and an associated access method 412a ('simple').

The access methods may associate logical field names 410 to a particular physical data representation 314 (See FIG. 3) in a database 227. By way of illustration, two data representations are shown in FIG. 3, an XML data representation $314_1$, and a relational data representation $314_2$. However, the physical data representation $314_N$ indicates that any other data representation, known or unknown, is contemplated. In one embodiment, a single data abstraction model 148 may contain field specifications with associated access methods for two or more physical data representations 314. In an alternative embodiment, a separate data abstraction model 148 may be provided for each separate data representation 314.

Any number of access method types is contemplated depending upon the number of different types of logical fields to be supported. In one embodiment, access methods for simple fields, filtered fields and composed fields are provided. For example, field specifications for Field A exemplify a simple field access method 412a. Simple fields are mapped directly to a particular entity in the underlying physical data representation (e.g., a field mapped to a given database table and column). By way of illustration, the simple field access method 412a, shown in FIG. 4 maps the logical field name 410a ('LastName') to a column named "lname" in a table named "Test Table," as illustrated.

The field specification for Field X exemplifies a filtered field access method 412b. Filtered fields identify an associated physical entity and provide rules used to define a particular subset of items within the physical data representation. For example, the filtered field access method 412b may map the logical field name 410b to a physical entity in a column named "TestVal" in a table named "Test Table" and may define a filter for the test values. For example, in one embodiment, the filter may define a numerical range in which the test values may be deemed valid.

A composed field access method may also be provided to compute a logical field from one or more physical fields using an expression supplied as part of the access method definition. In this way, information which does not exist in the underlying data representation may be computed. For example, a sales tax field may be composed by multiplying a sales price field by a sales tax rate.

It is contemplated that the formats for any given data type (e.g., dates, decimal numbers, etc.) of the underlying data may vary. Accordingly, in one embodiment, the field specifications 408 may include a type attribute which reflects the format of the underlying data. However, in another embodiment, the data format of the field specifications 408 is different from the associated underlying physical data, in which case an access method is responsible for returning data in the proper format assumed by the requesting entity.

Thus, the access method must know what format of data is assumed (i.e., according to the logical field) as well as the actual format of the underlying physical data. The access method may then convert the underlying physical data into the format of the logical field. By way of example, the field specifications 408 of the data abstraction model 248 shown in FIG. 3 are representative of logical fields mapped to data represented in the relational data representation $314_2$. However, other instances of the data abstraction model 248 map logical fields to other physical data representations, such as XML.

Each field 408 of the data abstraction model 148 may also include a concept code 409. For example, the concept code for field 408a may be 101 as illustrated in FIG. 4. Concept code 409 may associate a respective field 408 to a predefined universal concept. For example, field 408a illustrated in FIG. 4 is associated with a column containing last names. Accordingly, field 408a is titled "Last Name" and associated with the column "l_name" in the table "Test Table". However, the concept "last name" may have several synonyms. For example, in some systems last names may be identified as a "surnames" or "family names". The concept code 409 may provide a means for identifying a universal concept, regardless of how it is specifically labeled in a given system. Accordingly, concept codes may also be referred to herein as "entity resolution attributes" in that these attributes are applied to resolve one local field definition (for a first data abstraction model) to another local field definition (for a second data abstraction model) on the basis of a standardized field definition.

For example, referring to FIG. 1, the data abstraction model in server 102a may have a logical field named "Last Name" and the data abstraction model in server 102b may have a logical field named "Family Name". The concept code for the field "Last Name" in server 102a and the concept code for the field "Family Name" in server 102b may both be 101 because they both refer to the same concept.

While a numerical concept code 409 is illustrated in FIG. 4, in alternative embodiments any combination of alphabets, numbers, words, phrases, symbols, and the like may be used to define concept codes. In one embodiment of the invention, the concept code 409 may be derived from a recognized universal vocabulary, such as, for example, a standardized industry-specific vocabulary. Exemplary standardized universal vocabularies may include, among others, UMLS (Universal Medical Language System), MeSH (Medical Subject Headings), SnoMed (Systematic Nomenclature of Medicine), and the like.

Furthermore, while standardized universal vocabularies are described herein with reference to concept codes 409, in alternative embodiments, the concept codes 409 may be generated for internal use by groups of individuals and/or organizations. For example, while working on a project, one or more entities working on the project may agree upon a standardized set on concepts and respective concept codes for categorizing data. Thereafter, each entity may then generate their own respective data abstraction models to store data related to their respective project tasks in their own respective server or system. The data abstraction model generated by each entity may be different. For example, each entity may define its own logical fields in a respective data abstraction model which may be distinct from the logical fields defined by other entities. However, the concept codes used to define fields in the respective data abstraction models may be derived from the agreed upon set of concept codes.

Retrieving Results from Multiple Peer Devices

Figure 5:
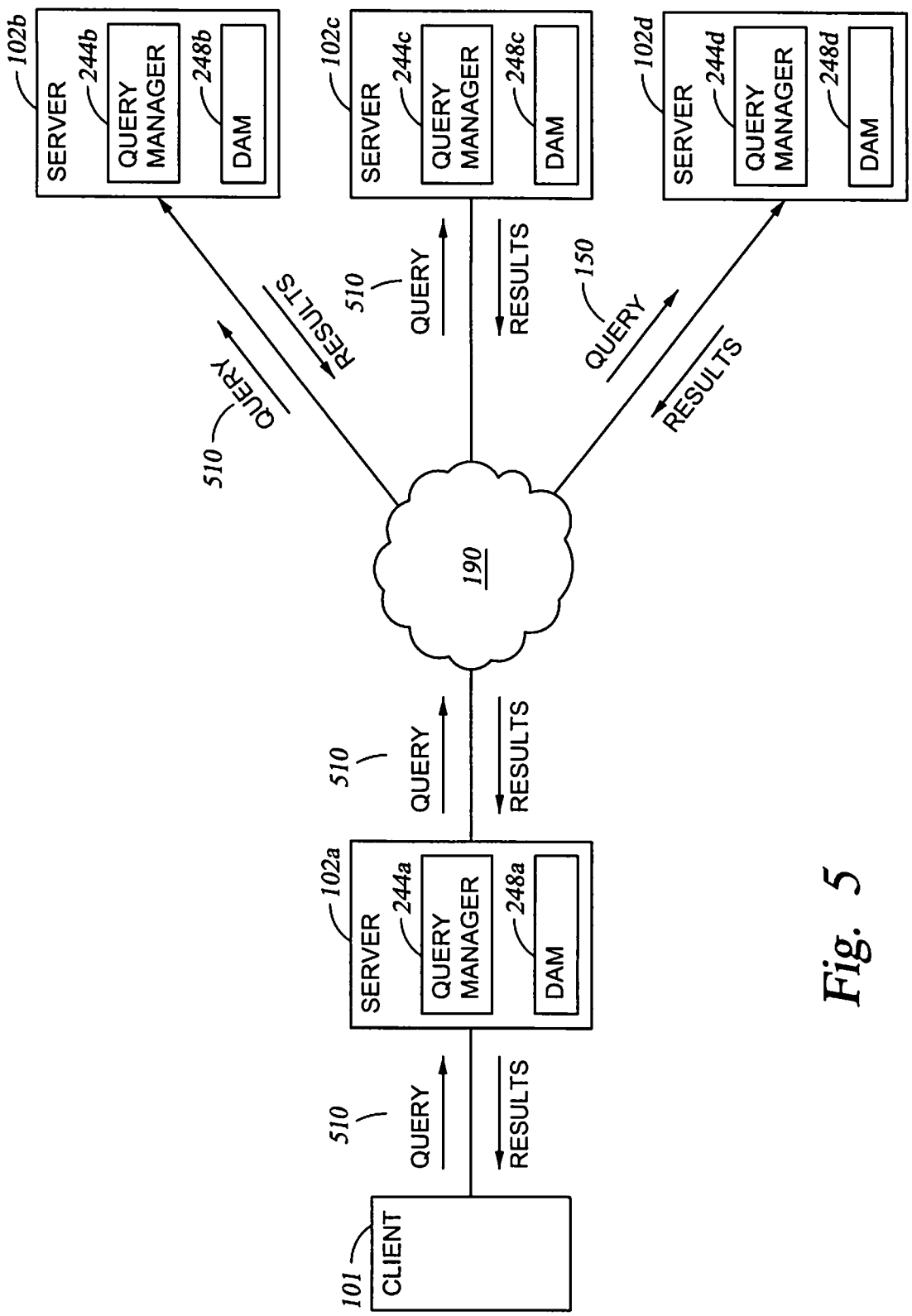
FIG. 5 illustrates query execution in an exemplary system according to an embodiment of the invention.

In one embodiment of the invention, the concept codes may facilitate retrieving query results from a plurality of devices in a P2P network. FIG. 5 illustrates another exemplary system 500 according to an embodiment of the invention. System 500 may be similar to system 100 illustrated in FIG. 1, and therefore may include at least one client computer 101 and a plurality of servers 102, for example, servers 102a-d coupled to each other via the P2P network 190. As illustrated in FIG. 5, each of the servers 102a-d may include a respective data abstraction model 248a-d. The data abstraction models 248a-d may define logical fields that may be used to compose abstract queries that may be issued against databases in respective servers 102a-d.

In one embodiment of the invention, the servers 102a-d may be peer devices operated by entities working on a collaborative project. For example, in a particular embodiment, each of the servers 102a-d may be associated with a respective university for storing research data. In alternative embodiments, each of the servers 102a-d may belong to a respective hospital or a department of a hospital, wherein each server 102 stores patient records, medical research data, and the like. More generally, each of the servers 102a-d may belong to one or more entities, whether individuals or organizations, that collect and store data in an independent and decentralized manner.

A decentralized approach to collecting and storing data may be advantageous because it may allow each entity to collect and store the data without being subject to each others' data collection procedures, data categorizations, analysis and the like. Therefore, the decentralized data collection and storing methods may facilitate a wide variety of entities to be seamlessly integrated into a collaborative project.

However, the independent data collection and storage may also result in difficulties while sharing data between the entities. For example, while performing research on a particular disease, a hospital or university may desire data collected by one or more other hospitals and/or universities to aid the research. However, different categorization of data in each hospital or university server may make it difficult to retrieve such data. For example, as described above, the DAM 248a may have a logical field named "Last Name" and DAM 248b may have a logical field named "Family Name". Furthermore, the DAM 248c may have a logical field named "Surname". Therefore, retrieving data related to last names from servers 102a-c may require separate abstract queries to be written for each of the servers 102a-c. Manually writing multiple abstract queries and combining the query results may be a tedious, inefficient and error prone process.

In one embodiment of the invention, the fields in the data abstraction models 248a-d may have similar concepts but may have varying logical field definitions. Embodiments of the invention provide an automated method for retrieving query results from a plurality of servers 102 coupled to a P2P network 109 using concept codes in response to receiving a query. For example, as illustrated in FIG. 5, an abstract query 510 may be sent from a client computer 101 to server 102a. Alternatively an application program 240 of server 102a (see FIG. 2) may generate an abstract query 510. The query 510 may be received by the query manager 244a of the server 102a. Query manager 244a may issue the abstract query 510 against a database associated with server 102a to retrieve at least some of the results of the query.

Furthermore, the query manager 244a may send the abstract query 510 to one or more of the servers 102b-d to request further results for the abstract query 510, as illustrated in FIG. 5. For example, in one embodiment, the server 102a may include a record including a list of the peer computers 102b-d. Accordingly, the query manager 244a may be configured to access the record to determine peer computers prior to sending the abstract query 510 to the peer servers 102b-d. In one embodiment, the query manager 244a may send the abstract query 510 to all known peers servers. Alternatively, in some embodiment, the query manager 244a may send the abstract query 510 to a subset of the known peers.

The abstract query 510 may be received by each of query managers 244b-d at the servers 102b-d. Each of the query managers 244b-d may convert the abstract query 510 to a local abstract query based on concept codes as will be described in greater detail below. The query managers 244b-d may issue the local abstract queries against respective databases associated with the servers 102b-d to retrieve further results for the abstract query 510.

In one embodiment, the query results from each of the servers 102*b-d* may be transferred to the server 102*a* via the P2P network 190, as illustrated in FIG. 5. The query results from each of the servers 102*b-d* may be received by the query manager 244*a*. In one embodiment, the query manager 244*a* may combine the results received from the servers 102*b-d* with the query results retrieved from the server 102*a* and provide the results to a requesting client 101 or application program 240. Alternatively, the query manager may be configured to average and/or normalize the set of results received from the server 102 *a-d*.

In some embodiments, the abstract query 510 may include one or more clauses that determine how query results are to be presented. For example, in a particular embodiment, the abstract query 510 may include a sort clause that, for example, requires that query results be presented in an ascending or descending order in relation to a particular results field. Accordingly, in some embodiments, the query manager 244*a* may be configured to perform one or more operations, for example, sorting, on the combined result set prior to presenting the query results to a requesting entity. In some embodiments, the query manager 244*a* may be configured to provide source identification data of the query results to a requesting entity. For example, the query manager 244*a* may be configured to identify the particular server 102*a-d* from which a particular query result is derived. The identification data may be displayed in an identification field that may be included in the query results.

In one embodiment of the invention, the abstract query 510 received by server 102 from a client 101 or an application program 240 of server 102*a* may include logical fields defined by the abstraction model 248*a* of server 102*a*. An exemplary abstract query 510 is provided below:

```
SELECT First Name
WHERE Last Name = "Smith"
```

The abstract query 510 provided above may be configured to retrieve first names of individuals whose last name is "Smith". Illustratively, the fields "First Name" and "Last Name" may be logical fields defined by the data abstraction model 248*a* of server 102*a*.

In one embodiment of the invention, abstract query 510 may be transferred to the one or more other servers 102*b-d* by query manager 244*a* along with concept codes associated with each logical field of the abstract query 510. In one embodiment, the concept codes may be encoded into the abstract query 510. For example, the query manager 244*a* may transfer the concept codes for "Last Name" and "First Name" along with the abstract query 510 provided above to the one or more other servers 102*b-d*.

Upon receiving the abstract query 510 from server 102*a*, each of the one or more query managers 244*b-d* may be configured to convert the abstract query 510 to a local abstract query based on the concept codes associated with each logical field of abstract query 510. For example, the DAM 248*b* of server 102*b* may include the logical fields "Family Name" and "Given Name". The concept codes associated with the logical fields "Last Name" and "First Name" of DAM 248*a* of server 102*a* may be the same as the concept codes associated with the logical fields "Family Name" and "Given Name" of DAM 248*b* of server 102*b*. Accordingly, the query manager 244*b* of server 102*b* may be configured to generate the following local abstract query upon receiving the abstract query 510 provided above:

```
SELECT Given Name
WHERE Family Name = "Smith"
```

Local abstract queries may be similarly generated at each of the servers 102 receiving the abstract query 510 to retrieve results. The results may then be transferred to the server 102*a* via the network 190. Upon receiving the query results from the server 102*a* and one or more other servers 102*b-d*, query program 244*a* of server 102 may provide the results to a requesting client computer 101 or application 240.

In one embodiment of the invention, providing the results to a requesting client computer or application may involve performing a union operation to combine results received from each server 102*a-d*. However, any other reasonable method of integrating results received from multiple sources, for example, concatenation, may be also used. In alternative embodiments, the results from each source may be provided separately, for example, in separate files, or separated within a given results file. In one embodiment, the results from each of the servers 102 may be displayed in a GUI screen at the client computer 101.

In one embodiment of the invention, one or more servers 102 may receive the query 510, but may not have any results for the query. For example, server 102*d* may receive abstract query 510 described above, but may not have a logical field corresponding to the concept code of "Last Name". Accordingly, the server 102*d* may be configured to respond to the server 102*a* with a "No result" or error message.

In one embodiment of the invention, the query manager 244*a* of server 102*a* may be configured to wait until results (or other response) are received from each of the one or more servers 102*b-d* before providing the query results to the requesting client computer 101 or application 240. In alternative embodiment, query manager 244*a* may wait for a predefined period of time to receive results. If the results are not received from all servers 102 within the predefined period of time, the query program 244*a* may be configured to provide only results received within the predefined period of time.

For purposes of illustration only, FIG. 5 shows the query 510 being sent from server 102*a* to each of the servers 102*b-d*. However, more generally, the query 510 may be sent from any server 102, to any one or more other servers 102 coupled to the P2P network 190. For example, each of the servers 102 of FIG. 5 may be configured to receive abstract queries from respective client computers 101 or application programs 240 and send the query to one or more other servers 102 as described above. Furthermore, in some embodiments the client computer 101 may be directly coupled with the P2P network 190 and configured to issue a query 510 to one or more servers 102. Accordingly, in some embodiments, the client computer 101 may include similar components as the servers 102, for example, a data abstraction model, query manager, and the like.

Furthermore, while embodiments are described herein with respect to a client-server model, this model is merely used for purposes of illustration. Persons skilled in the art will recognize other communication paradigms, all of which are contemplated as embodiments of the present invention. Indeed, as pointed out above, the server computers 102 may in fact be related as peers, rather than computers of in a client-server paradigm. Further, even assuming a client-server model, a given computer may behave as either a client or a server at different times, depending on the context. As such, the terms "client" and "server" are not to be taken as limiting.

Figure 6:
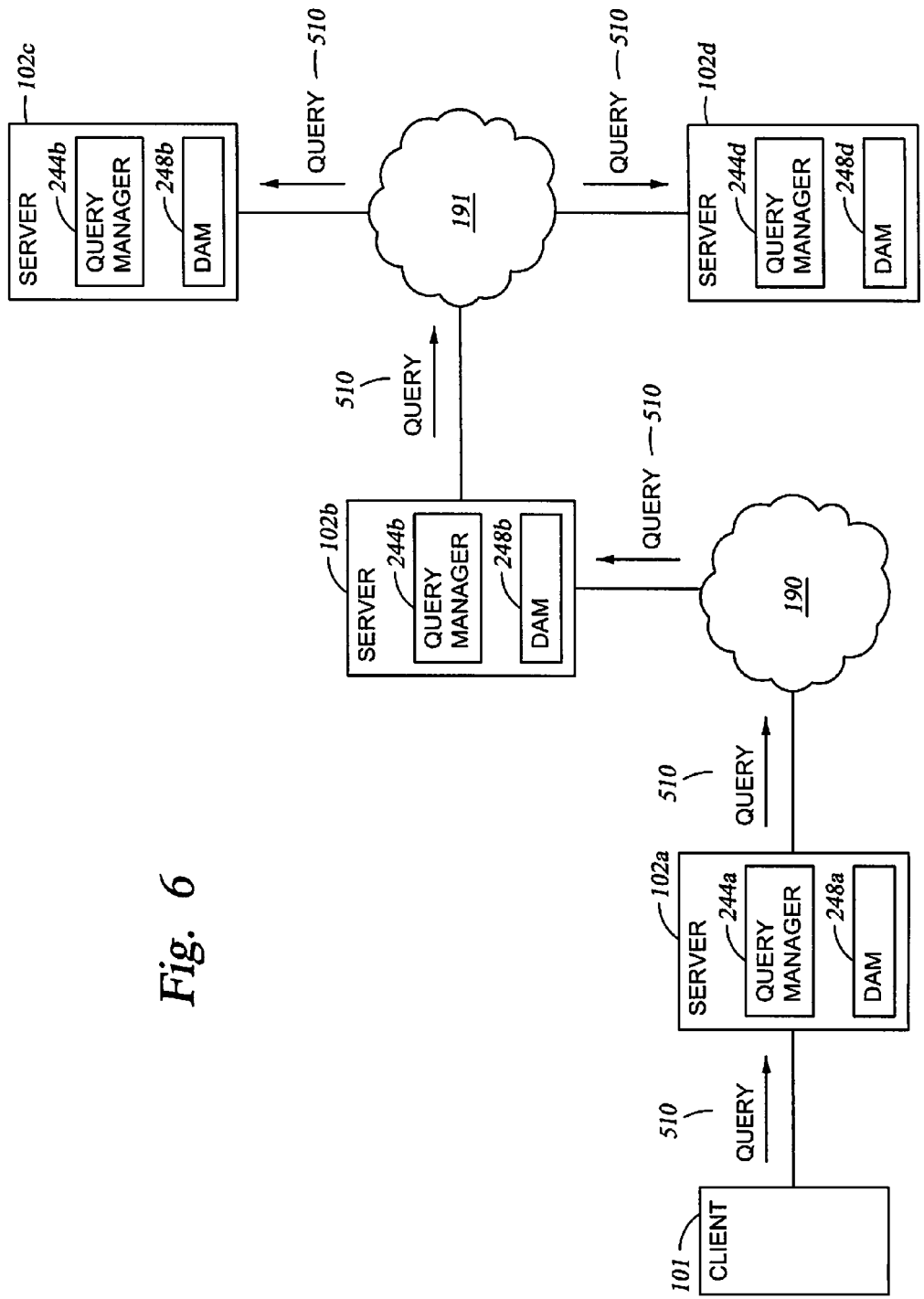
FIG. 6 illustrates query execution in another exemplary system according to an embodiment of the invention.

FIG. 6 illustrates another system 600 according to an embodiment of the invention. System 600 may include at least one client computer 101 and a plurality of servers 102, as illustrated in FIG. 6. As illustrated, the client computer 101 may be coupled with a server 102a. The server 102a may be coupled with a server 102b via a first P2P network 190, and server 102b may be coupled to the servers 102c and 102d via a second P2P network 191.

As illustrated in FIG. 6, an abstract query 510 may be sent from the client computer 510 to the server 102a. Server 102a may send the abstract query to server 102b via the network 190, as discussed above. The server 102b may retrieve results for the abstract query 510, for example, by converting the abstract query 510 to a local query, as discussed above. In addition, the query program 244b of the server 102b may transfer the query 510 to one or more other peers 102c and 102d via the P2P network 191 to retrieve further results for the query 510. For example, server 102b may include a record including a list of peer servers associated with the server 102b. Accordingly, query program 244b may access the record to determine its peer servers, and send the abstract query 510 to one or more of the peers listed in the record.

The server 102b may receive the results from the servers 102c and 102d via network 191, and combine the results with results from the server 102b before sending the results to the server 102a via the network 190. In an alternative embodiment, the server 102b may transfer its own results to the server 102a via network 190, and then subsequently transfer the results from servers 102c and 102d to the server 102a as they are received.

In some embodiments, each of servers 102c and 102d may be coupled with one or more other networks not shown in FIG. 6. Accordingly, the servers 102c and 102d may continue to send the query 510 to respective peers via the one or more other networks such that the query 510 cascades through multiple networks and multiple servers 102 to retrieve a comprehensive and complete set of results fro the query 510.

The transfer of an abstract query from one server 102 to one or more other servers 102 over a network, for example, networks 190 and 191, is referred to herein as a "network hop". In one embodiment of the invention, a server 102 or client 101 initiating transfer of an abstract query 510 to one or more other servers 102 may be configured to define a maximum network hops for the abstract query. For example, if the maximum hop for the query is set to 1, the abstract query 510 may only be sent from the server 102a to the server 102b via the network 190 (i.e. one network hop), but may not be sent from the server 102b to the servers 102c and 102d.

In one embodiment, the abstract query 510 may include the maximum hop value encoded therein. Furthermore, the abstract query 510 may also include a current number of hops encoded therein. Each server 102 may be configured to update the current hop value encoded in the abstract query 510 before sending the abstract query 510 to one or more other servers 102 via a P2P network. If a server 102 receives an abstract query 510 wherein the maximum hop value is equal to the current hop value, the server 102 may not send the query to any further servers 102.

In some embodiments, a server 102 may be coupled with multiple P2P networks. Therefore, it is possible that the server 102 may receive the same query 510 from each of the multiple P2P networks. However, providing query results each time the abstract query is received may result in a requesting client computer 101 or server 102 receiving duplicate copies of the query results. Therefore, in one embodiment of the invention, the query 510 may include a unique query ID encoded therein. Therefore, if a server 102 receives an abstract query having the same query ID as a previously received abstract query, the server 102 may simply ignore the abstract query or explicitly signal to the sending server that no action will be taken.

Figure 7:
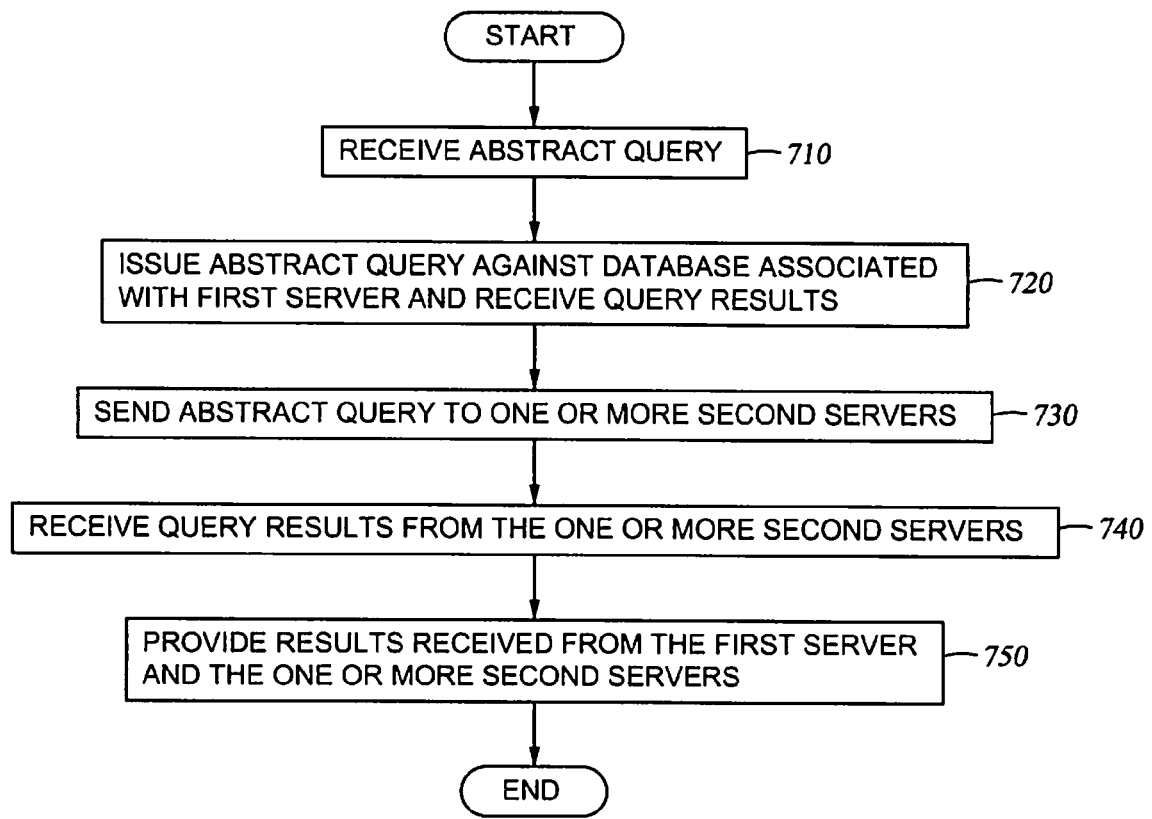
FIG. 7 is a flow diagram of exemplary operations performed by a query manager according to an embodiment of the invention.

FIG. 7 is a flow diagram of exemplary operations performed by a query manager 244 according to an embodiment of the invention. The operations may begin in step 710 by receiving an abstract query. The abstract query may be received from a client computer 101 or an application 240 of a first server 102. Furthermore, the received abstract query may contain logical fields defined according to a first data abstraction model associated with the first server 102.

In step 720 the query manager 244 may issue the abstract query against a database associated with the first server 102 and receive query results. In step 730, the query manager 244 may send the abstract query to one or more second servers 102 via a network. The query manager may then receive results from the abstract query from one or more of the second servers 102 via the network in step 740. In step 750, the query manager 244 may provide the results received from the first server and one or more second servers to the requesting client computer or application 240.

Figure 8:
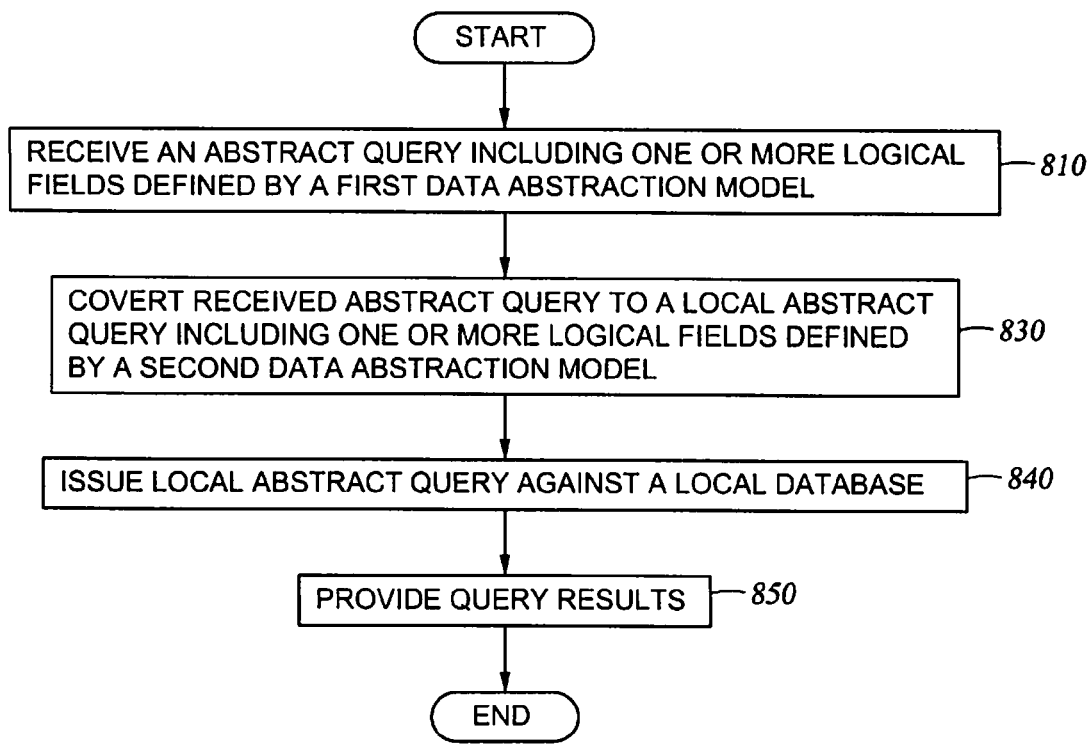
FIG. 8 is another flow diagram of exemplary operations performed by a query manager according to an embodiment of the invention.

FIG. 8 is a flow diagram of exemplary operations performed by a query manager 244 according to another embodiment of the invention. The operations may begin in step 810 by receiving an abstract query including one or more logical fields defined by a first data abstraction model. In step 830, the query manager 244 may convert the received abstract query to a local abstract query including logical fields defined by a second data abstraction model.

Converting the received abstract query to a local abstract query may involve determining concept codes associated with each of the logical fields associated with the received abstract query. The concept codes may be, in one embodiment, received with the abstract query. The query manager 244 may identify logical fields in the second data abstraction model associated with the concept codes and generate the local abstract query based on the identified logical fields. In step 840, the query manager 244 may issue the local abstract query against a local database to retrieve query results. In step 850, the query manager may provide the query results to a requesting server 102 or client 101.

Notification of Available Query Augmentation within Query Results

In some cases an abstract query received by a server 102 may contain one or more logical fields with concept codes that do not have corresponding logical fields in a local data abstraction model. For example, the exemplary abstract query 510 includes a logical field "Last Name". As illustrated in FIG. 4, the logical field "Last Name" may have a concept code 101. It is possible that one or more of the servers 102 (see FIG. 5) may not have a logical field corresponding to the concept code 101 in their respective data abstraction model.

For example, data abstraction model 248d of server 102d (see FIG. 5) may not have a logical field that is associated with concept code 101. Therefore, the server 102d may not be able to provide results for the abstract query 510 because, as illustrated in the exemplary query above, the logical field "Last Name" is a part of the query condition.

While it is possible that a particular server 102 may not have logical fields in their respective data abstraction models that are associated with a specifically identified concept code, it may be possible that the server 102 contains logical fields associated with related concepts. For example, in one embodiment, the query 510 may include a logical field "Felines" with a concept code 676. The server 102d may not contain any logical fields associated with the concept code 676 in the data abstraction model 248d. However, the data abstraction model 248d may include a logical field "Tigers" with a concept code 677. Because "Tigers" are a type of "Felines", the data associated with the logical field "Tigers" may be relevant to the query. Accordingly, retrieving data associated with a logical field of a related concept may be desirable.

In some cases, even if the logical field "Felines" associated with the concept code 676 is found, it may be desirable to notify the user of the existence of the logical field "Tigers" associated with concept code 677. By providing such notification, the user may be able to create a more robust query to extract desired results. For example, the user may modify the abstract query 510 to include the logical field "Tigers". The modified abstract query 510 may retrieve additional desired results from server 102d.

In some embodiments of the invention, providing query results may include providing, along with the query results, metadata associated with concepts related to the concepts identified in the abstract query. By providing such metadata, a user or application may be able to reposition the query to retrieve results from logical fields associated with the related concepts. Alternatively, in some embodiments, a server 102 receiving a query may be configured to automatically reposition the query to retrieve results for logical fields associated with related concepts. Repositioning the query, as described herein, may generally involve changing, adding, subtracting, or otherwise modifying the query and/or query conditions so that the modified query retrieves a different set of results.

Any number of methods for identifying related concepts is contemplated. For example, in some embodiments concepts may have predefined relations to one another. For example, a first concept may be defined as a synonym of a second concept. Alternatively, the first concept may be defined as a type, use, or the like, of the second concept. In a particular embodiment, the concepts may have predefined relations to one another as defined by a hierarchical structure such as, for example, a data tree, wherein a position of the concept in the data tree relative to one or more other concepts defines the relationship between the concepts. In some embodiments, the relationship between concepts may be derived from a recognized universal industry standard. For example, Medical Subject Headings (MeSH) includes medical terminology known as descriptors arranged in a hierarchical manner.

Figure 9:
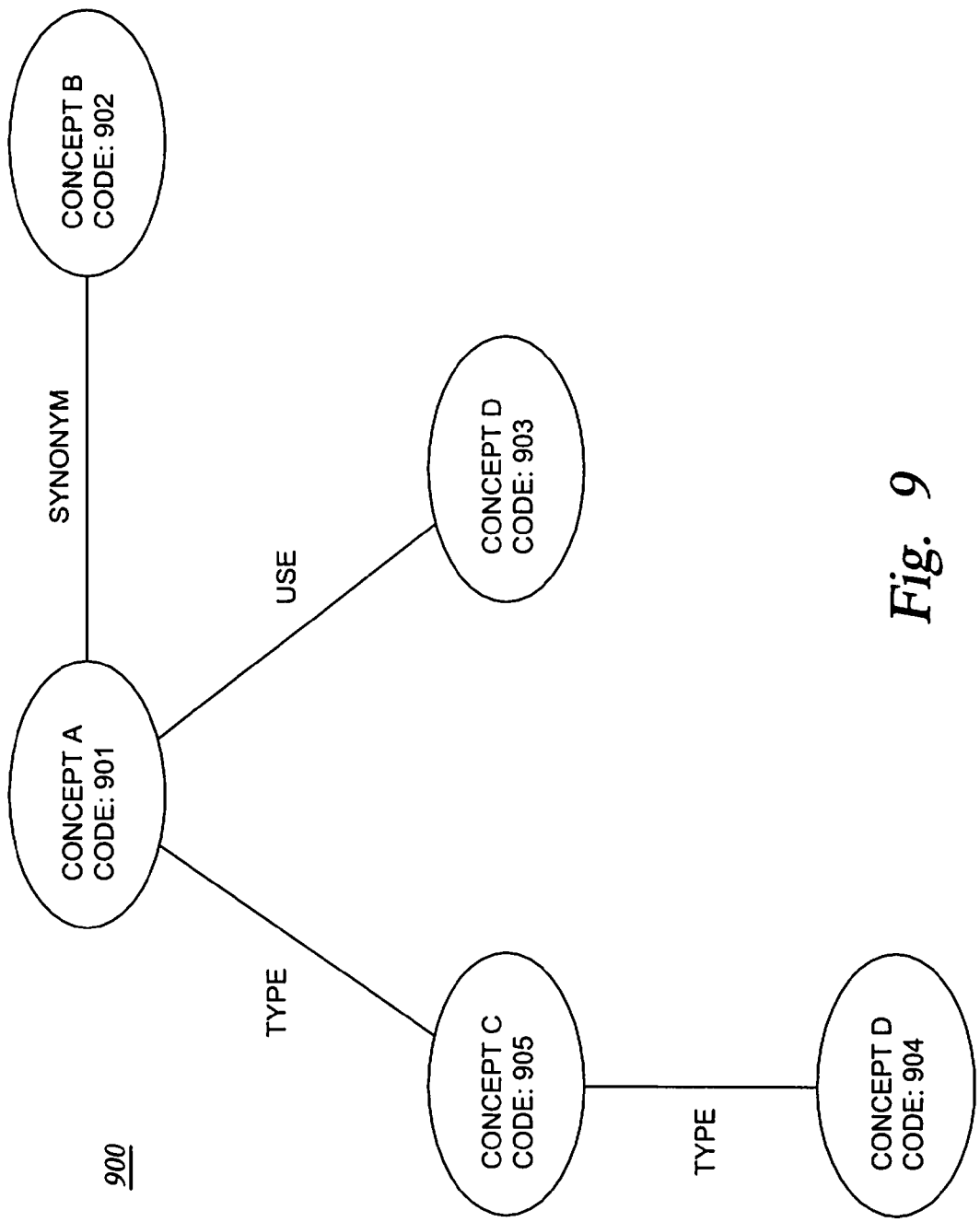
FIG. 9 illustrates an exemplary structure defining relationships between concepts.

FIG. 9 illustrates an exemplary structure 900 defining relationships between a plurality of concepts A-E. In one embodiment, the structure 900 may be defined within the data abstraction model of each server 102a-d. For example, Concept B is defined as a synonym of Concept A. In one embodiment of the invention, if a first concept is a synonym of a second concept identified in a received abstract query, metadata regarding the first concept may be sent back to the requesting entity. For example, a description of the concept (such as the concept name) and concept code may be sent to the requesting entity along with the query result. In some embodiments, the metadata may include logical field names and definitions associated with the related concepts.

In an alternative embodiment, if a first concept is synonym of a second concept identified in a received abstract query, a logical field associated with the second concept may be used to generate a local query. For example, the query 510 in FIG. 5 may include a logical field associated with Concept A. The data abstraction model 248d of server 102d may include one or more logical fields associated with Concept B, but no logical fields associated with Concept A. Because Concept B is a synonym of Concept A, the query manager 244d may simply use the logical fields associated with Concept B to compose a local abstract query to retrieve results for the abstract query 510, even though the concept codes for Concept A and Concept B are different.

Referring back to FIG. 9, Concept C is defined as a type of Concept A in the structure 900. In other words, Concept C may be a subset of Concept A. For example, as discussed above, "Tigers" are a type of "Felines". Also illustrated in FIG. 9 is Concept D, which is defined as a use of Concept A. For example, "Integrated Circuits" may be a use related to "Silicon". As with synonyms, in one embodiment, metadata regarding concepts identified as types or uses may be sent to a requesting entity along with query results. Alternatively, a query program 244 may generate a local query based on logical fields associated with concepts that are types or uses of concepts identified in a received query 510.

While synonyms, types and uses are described herein as means for determining related concepts, in alternative embodiments, any other reasonable means for determining relationship between concepts may be used. For example, in some embodiments the relative position of the concepts in the hierarchical structure 900 may determine whether concepts are related. For example, FIG. 9 illustrates a Concept E which is defined as a type of Concept D. In some embodiments, related concepts for any particular concept may include concepts that are a predetermined number of levels from the concept. For example, if a threshold of 1 is used, Concept C may be a related to Concept A but Concept D will not be related to Concept A.

Figure 10:
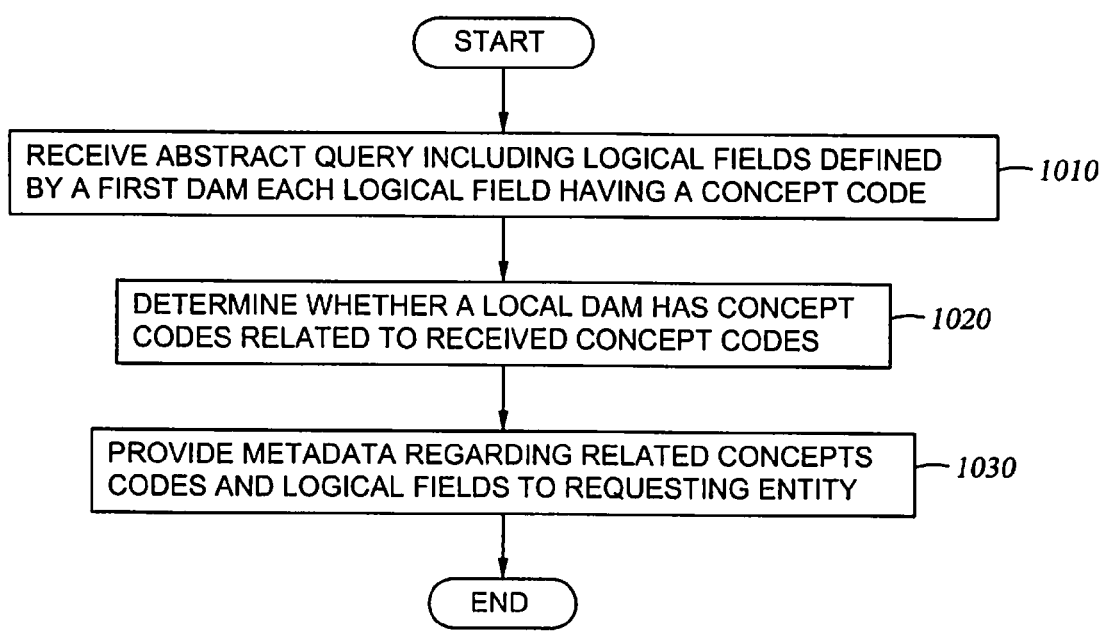
FIG. 10 is a flow diagram of exemplary operations performed to provide metadata regarding concepts and logical fields, according to an embodiment of the invention.

FIG. 10 is a flow diagram of exemplary operations performed by a query manager 244 according to an embodiment of the invention. The operations may begin in step 1010 by receiving an abstract query including one or more logical fields defined by a first data abstraction model and a concept code associated with each of the one or more logical fields. In step 1020, the query manager 244 may determine whether a local data abstraction model has concept codes related to the received concept codes. For example, in one embodiment, to determine related concepts, query manager 244 may reference a data structure such as, the data structure 900 described above with respect to FIG. 9. If related concept codes are found, the query manager may be configured to (at step 1030) provide metadata related to the related concept codes to a requesting entity.

Alternatively, in some embodiments, the query manager 244 may generate a local abstract query based on logical fields associated with one or more received concept codes and one or more related concept codes. The local abstract query may be issued against a local database to retrieve query results, which may be provided to the requesting entity.

Augmenting Local Data Abstraction Models with Logical Fields from Peers

The data abstraction models 248a-d illustrated in FIG. 5 may each be different, including respective distinct logical fields. Therefore, the logical fields of abstract query 510 which may be based on data abstraction model 248a, may be significantly different than logical fields in data abstraction models 24db-d. However, access to the distinct logical fields in data abstraction models 248b-d may be desirable while composing the abstract query 510 because the distinct logical fields may contain desired data.

It may be possible that distinct logical fields in different servers 102 refer to the same concept. For example, data abstraction model 248a of server 102a may include a logical field "Desktops" that is defined by a concept code associated with "computers". Data abstraction model 248b of server 102b may include a logical field "Laptops" that is also defined by the concept code associated with "computers". Because the data abstraction model 248a only includes the logical field "Desktops", query 510 may be limited to that particular logical field. However, the logical field "Laptops" may also be desirable while composing query 510 because desktops and laptops are both associated with the same concept, i.e., computers.

In one embodiment of the invention, the query managers 244a-d of each of servers 102a-d may be configured to identify distinct logical fields in each others' data abstraction models 248a-d, and copy the distinct logical fields into a respective local data abstraction model. For example, query manager 244a may be configured to identify distinct logical fields in the data abstraction models 248b-d and copy the distinct logical fields into the data abstraction model 248a. Therefore, the distinct logical fields may be available for composing the query 510.

In one embodiment, identifying the distinct logical fields to be copied may involve determining distinct logical fields that have the same concept code as a logical field in a local data abstraction model. For example, query manager 248a may determine that the logical field "Laptops" in the data abstraction model 248b has the same concept code as the logical field "Desktops" in the local data abstraction model 248a. Therefore, the logical field "Laptops" may be copied into the data abstraction model 248a. In some embodiments, the query manager 244 may also be configured to copy logical fields associated with concepts related to a concept of a local logical field. Determining related concepts is described in greater detail in the previous section.

While logical fields from one or more peer servers 102 may be copied into a local data abstraction model, the copied logical fields may not map to physical fields in a local database. This may be because there may be no physical data corresponding to the copied logical field in the server 102. Therefore, queries composed using the copied logical fields and issued against the local database may fail. However, the query may still be transferred to peer servers 102 to retrieve query results therefrom. For example, if the abstract query 510 is composed with the logical field "Laptops" copied from data abstraction model 248b, the abstract query may fail to retrieve results if issued against a database at server 102a because there may be no physical data corresponding to the copied logical field "Laptops" in server 102a. However, the abstract query 510 may be transferred, as described above, to the server 102b via the network 190 by the query manager 244a, from where query results may be retrieved.

In one embodiment of the invention, the query manager 244 may be configured to periodically seek distinct logical fields as described above from data abstraction models in peer servers 102. In alternative embodiments, the distinct logical fields may be discovered during interaction between the servers 102. For example, as described in the previous section, the servers 102 may be configured to transfer metadata regarding concepts, concept codes, and logical fields to each other in response to receiving an abstract query. The metadata may be analyzed to determine whether distinct desirable logical fields exist in peer servers 102.

In one embodiment of the invention, the query manager 244 may be configured to periodically validate logical fields in a local data abstraction model 248. For example, query manager 244a may verify that a copied logical field in data abstraction model 248a still exists in a foreign data abstraction model, for example, data abstraction model 248b, from which the logical field was copied. If the copied logical field no longer exists in the foreign data abstraction model, the query manager may be configured to remove the copied logical field from the local data abstraction model.

CONCLUSION

By providing a means for converting an abstract query containing logical fields defined in a first data abstraction model to an abstract query containing logical fields defined in a second data abstraction model based on concept codes associated with the logical fields, embodiments of the invention allow query results to be retrieved from multiple independent systems more efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method for retrieving query results comprising:
   receiving, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being metadata;
   converting the first abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts;
   issuing the second abstract query against the second database to retrieve results for the second abstract query; and
   providing the results of the second abstract query to the requesting entity.

2. The method of claim 1, further comprising, transferring the first abstract query to at least one third device.

3. The method of claim 2, further comprising, receiving results for the first abstract query from the third device and transferring the results received from the third device to the first device.

4. The method of claim 1, wherein the first and second devices are part of a peer-to-peer network.

5. The method of claim 1, wherein the requesting entity is an application.

6. The method of claim 1, wherein the first device and second device are servers.

7. The method of claim 1, wherein the first and second data abstraction models, and their respective logical field definitions, are distinct from one another.

8. A non-transitory computer readable medium containing a program which, when executed, performs an operation, comprising:

receiving, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being metadata;

converting the first abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts;

issuing the second abstract query against the second database to retrieve results for the second abstract query; and providing the results of the second abstract query to the requesting entity.

9. The computer readable medium of claim 8, wherein the operation further comprises transferring the first abstract query to at least one third device.

10. The computer readable medium of claim 9, wherein the operation further comprises receiving results for the first abstract query from the third device and transferring the results received from the third device to the first device.

11. The computer readable medium of claim 8, wherein the first and second devices are part of a peer-to-peer network.

12. The computer readable medium of claim 8, wherein the requesting entity is one of a client computer and an application.

13. The computer readable storage medium of claim 8, wherein the first and second data abstraction models, and their respective logical field definitions, are distinct from one another.

14. A system, comprising a plurality of devices coupled via a network, wherein each device is configured to:

receive, from a requesting entity, a first abstract query comprising one or more logical fields defined by a first data abstraction model comprising a plurality of first logical field definitions mapped to physical fields of a first database in a first device, wherein one or more of the first logical fields definitions associate respective first logical fields to respective concepts of a predefined set of concepts, the concepts being metadata;

convert the first abstract query to a second abstract query comprising one or more logical fields defined by a second data abstraction model, the conversion comprising, for each logical field of the first abstract query, determining a corresponding logical field in the second data abstraction model, the corresponding logical field being associated with a same concept as the logical field of the first abstract query, wherein the second data abstraction model comprises a plurality of second logical field definitions mapping the second logical fields to physical fields of a second database in a second device, wherein one or more of the second logical fields definitions associate respective second logical fields to respective concepts of the predefined set of concepts;

issue the second abstract query against the second database to retrieve results for the second abstract query; and provide the results of the second abstract query to the requesting entity.

15. The system of claim 14, wherein each device is further configured to transfer the first abstract query to at least one third device.

16. The system of claim 15, wherein each device is further configured to receive results for the first abstract query from the third device and transfer the results received from the third device to the first device.

17. The system of claim 14, wherein the network is a peer-to-peer network.

18. The system of claim 14, wherein the first device and second device are servers.

19. The system of claim 14, wherein the requesting entity is an application.

20. The system of claim 14, wherein the first and second data abstraction models, and their respective logical field definitions, are distinct from one another.

* * * * *